Jan. 24, 1939. J. S. FORBES 2,144,754
VALVE
Filed Sept. 2, 1937
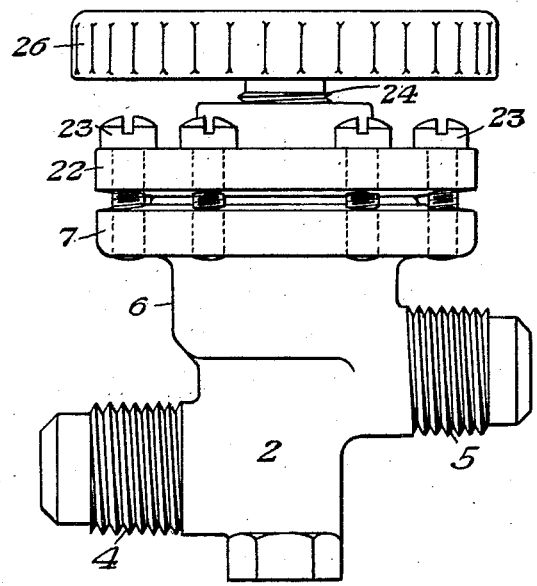
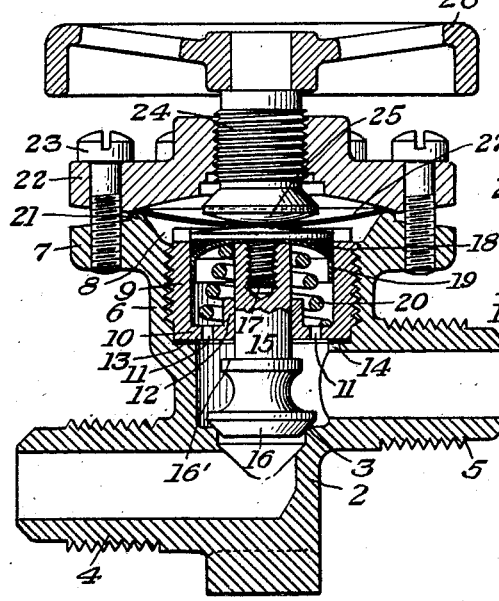
INVENTOR
John S. Forbes
by Stebbing, Blenko & Parmelee
ATTORNEYS Patented Jan. 24, 1939

2,144,754

UNITED STATES PATENT OFFICE 2,144,754

VALVE

John S. Forbes, Mount Lebanon, Pa.

Application September 2, 1937, Serial No. 162,081

9 Claims. (Cl. 251—31)

This invention is for a valve and relates particularly to a valve especially designed to be used where fluids at high pressures are to be controlled, and particularly fluids which are extremely difficult to confine, such as refrigerant gases and light hydrocarbon gases. More particularly the present invention is for a type of valve known in the art as a "diaphragm valve".

Diaphragm valves are now extensively used in places where refrigerating gases and light hydrocarbon gases are encountered. These valves usually comprise a body having a removable hood. There is an inner valve stem which carries the valve to cooperate with a valve seat in the body, this stem being reciprocable. There is an actuating stem having a threaded engagement with the hood. Between the inner valve stem and the actuating stem there is a flexible metal diaphragm by means of which pressure can be communicated from the actuating member to the inner valve stem for closing the valve, but which is imperforate and, therefore, forms an effective seal against the escape of the confined gases. A back seating valve is commonly provided on the inner valve stem, which is effective when the valve is fully open for preventing the escape of fluids around the inner valve stem so that when the valve is fully open the hood may be removed along with the actuating member, and the diaphragm may be replaced. A typical valve of this character is disclosed in my prior Patent No. 1,890,505, granted December 13, 1932.

The present invention provides a valve of this general type wherein there is a second sealing means within the valve and attached to the inner valve stem for overcoming certain objections encountered in existing structures, this second sealing means avoiding any need for back seating of the valve.

The invention may be readily understood by reference to the accompanying drawing which illustrates an embodiment of my invention, in which Figure 1 is a side elevation of a valve embodying my invention;

Figure 2 is a vertical section through the valve of Fig. 1; and

Figure 3 is a partial section similar to Figure 2, but at 90° thereto, showing a modified embodiment of my invention.

In the drawing, 2 designates a valve body in which is a valve seat 3 and which has threaded nipples 4 and 5 thereon for connecting it into a fluid pressure line. On the body above the valve seat is an integral portion 6 having a lateral flange 7 thereon. The interior of the portion 6 provides a chamber 8. The inner wall of the portion 6 is threaded to receive a guide cup 9, the guide cup having a bottom 10 in which there are preferably perforations 11 and which preferably has a central bushing 12. The top of the cup 9 is provided with a transverse slot or slots, by means of which it may be engaged by a wide screw driver or suitable wrench for screwing it down tightly into position, the interior of the valve body having a shoulder 13 against which the bottom of the cup is forced and a washer preferably of soft metal 14 may be interposed between the bottom of the cup and the shoulder 13.

Slidably guided in the central guide or bushing 12 is an inner valve stem member 15, at the lower end of which is a valve 16 adapted to cooperate with the seat 3 when the valve is closed. The top of the stem 15 is provided with a screw 17 having a head, the diameter of which is substantially the same as the interior diameter of the cup 9 so as to have a close fit in this cup. Under the head of the screw 17 there is a washer 18 preferably formed of a semi-resilient material as, for example, synthetic rubber or natural rubber vulcanized to a fairly high degree, or a synthetic resinous material. This washer is provided on its inner face with a concave seat of substantially spherical curvature. The diameter of the washer is such that it has a working fit in the cup 9. Secured in position by the screw 17 against the under face of the washer 18 is a thin metal cup-like washer or diaphragm 19 having a flanged edge, this diaphragm 19 preferably being of thin resilient steel or other metal capable of yielding under the pressure of fluids encountered in the valve. For clearness of illustration, the drawing shows this cup-like diaphragm as having the thickness exaggerated over what it would preferably be in actual practice in a valve of the size illustrated. Confined within the cup is a compression spring 20, the bottom of which bears against the bottom of the cup and the upper end of which bears against the inner surface of the cup-like diaphragm 19.

The upper end of the valve body is provided with an annular rib 21. Mounted on the top of the valve body is a bonnet 22, the bonnet being secured to the valve body by means of a number of bolts 23 passing through the bonnet and screwed into holes tapped into the flange 7 on the valve body. The bonnet has a threaded opening at the center thereof through which passes a threaded valve actuating stem 24 on the lower end of which is a rounded terminal portion 25 of a diameter larger than the diameter of the stem. The upper end of the actuating stem is shown as being provided with a hand wheel 26, but it will be understood that an actuating lever or wrench may be substituted for the hand wheel. Clamped between the bonnet and the rib 21 is a flexible metal or other diaphragm 27, this diaphragm being confined between the terminal 25 and the head of the screw 17. The edge of the diaphragm is slightly grooved to conform to the rib 21 so as to be readily centered in position when the valve is being assembled, as well as to insure an effective seal being made.

The valve is used the same as any other diaphragm valve. Figure 2 shows the parts of the valve in closed position. To open the valve, the actuating member 24 is backed off so that the pressure acting against the valve 16 may push the valve upwardly, this opening of the valve being also accomplished where the pressure of the gas is relatively low through the action of the spring 20. As soon as the valve is opened, fluid may pass through the holes 11 in the bottom of the cup 9 into the chamber inside this cup. This pressure will force the snug-fitting metal cup 19 up tightly against the washer 18 and cause its flanged edge portion to be forced out into tight sealing engagement with the interior walls of the cup member 9. This forms an effective seal against the escape of gas. Should there be any slight leakage past this piston-like sealing means, the diaphragm 27 would, of course, prevent its escape. The valve can only open to a point where the shoulder 16' at the back of the valve 16 engages the bottom 10 of the cup member 9, further upward movement of the inner valve stem being restricted by the contact of these two surfaces. When the valve has been opened to its fullest extent, it is possible and practical to remove the bolts 23 and entirely remove the bonnet 22 to replace the diaphragm 27 or make other minor repairs to the valve.

It will therefore be seen that the present valve provides a structure wherein there is an inner valve stem and an outer actuating stem with an interposed sealing diaphragm, and wherein there is a packing element of piston-like form that moves with the inner valve stem to effectively seal the valve even though the diaphragm is removed. This piston-like sealing means movable with the inner valve stem, moreover, is of a character which increases in efficiency with an increase in pressure. By reason of the fact that the bonnet is attached to the valve body by a plurality of bolts, the bonnet can be removed in the field much more readily than any structures heretofore provided where the bonnet is threaded onto the valve body. The bonnet is removed from the body through the loosening of these bolts without likelihood of injuring the diaphragm, and by slightly grooving the periphery of the diaphragm, the diaphragm can be centered accurately and easily and will remain in centered position while the bonnet is being tightened without danger of injuring the diaphragm. The spherical seat provided on the under side of the screw 17 may be of metal, but by forming it as a separate washer 18 of a slightly deformable material, an increased sealing effect is obtained by the squeezing of this washer between the inner cup-like diaphragm 19 and the under surface of the screw. The metal cup sealing means is effective at all pressures and as the pressure increases, the effectiveness of the seal increases. The piston-like arrangement, moreover, tends to reduce the effect of pressure surges, either in open, closed, or intermediate positions of the valve member.

The modification illustrated in Figure 3 is one which preferably embodies the same principles as described in connection with Figure 2, but the structure is assembled somewhat differently for greater convenience of use under certain circumstances. In this figure the valve body is made of two parts, there being a lower part 30 and an intermediate or upper part 31. The lower part 30 contains the valve seat and is provided with the usual nipples by means of which it can be connected into a pipe line, similar to the nipples 4 and 5 of Figure 2. By reason of the fact that the section of Figure 3 is at right angles to the section shown in Figure 2, these nipples do not show in the drawing but their arrangement may correspond to any arrangement adapted to valves of this character. The lower part of the valve body has a shoulder 32 corresponding to the shoulder 14 of Figure 2. The intermediate member 31 of the valve body has a flange 33 to which the bonnet 34 is bolted in the manner described in connection with Figure 2. The member 31 has an integral projection 35 in place of the bushing or cup 9 of Figure 2, this extension being screwed into the upper part of the lower valve body, a sealing gasket being provided on the shoulder 32. On the inside of the upper valve member 31 is a central well or chamber 36, the walls of which form a cylinder for cooperation with the piston-like packing on the end of the inner valve stem, this inner valve stem being designated 15. The packing is preferably similar to that described in connection with Figure 2, and corresponding reference numerals have been used to designate the corresponding parts. Cooperating with the extension 35 on the intermediate body member is a separate bottom member 38 with a central guide 39 for the inner valve stem, there being holes through this bottom corresponding to the holes 11 of Figure 2. I prefer to slightly taper the walls of chamber 36 so that the metal cup 19 may be readily inserted from the bottom of the chamber. The structure of the valve and operating parts above the intermediate body member are generally the same as described in connection with Figure 2, and corresponding reference numerals have been used to designate the corresponding parts. If desired, the periphery of the flange 33 may be non-circular to facilitate the turning of the intermediate body member with a wrench relative to the lower body member. If desired, the bottom 10 of guide cup 9 (Figure 1) may be made separate similar to that shown and described in connection with Figure 3. In such construction it is preferable to taper the inner walls of cup 9 so as to facilitate the insertion of diaphragm 19 from the bottom of the cup.

It frequently happens that after a period of use, the inner packing on the inner valve member may need repair or some of the other parts of the valve have to be repaired. With the arrangement shown in Figure 2, it is sometimes difficult to remove the inner cup member 9 from the body of the valve inasmuch as special tools are required, and there may be inadequate clearance where the valve is located to make this operation easy. In the arrangement shown in Figure 3, the user of the valve can remove the entire intermediate member with all parts carried thereon and replace it with a similar member without taking the valve out of the line at all. The part so removed can then be taken to a shop or returned to the manufacturer for proper servicing under favorable conditions. In this respect, the construction shown in Figure 3 has certain commercial advantages over the arrangement shown in Figure 2, the general principle of valves being otherwise the same.

While I have illustrated and described a certain preferred embodiment of my invention, it will be understood that various changes and modifications from the structures illustrated are contemplated and the invention may be otherwise embodied in variously modified structures.

I claim:

1. A diaphragm type valve which is sealed against escape of fluid upon rupture of the diaphragm whether the valve element is open or closed or in any intermediate position or when the valve bonnet is removed for replacement of the diaphragm, comprising a body member having means therein providing a cylindrical chamber sealed into the body to prevent leakage of the fluid between said means and the body, a valve element having a valve portion and a stem portion, an expansible cup-like sealing member on the stem portion adapted to be urged by fluid pressure against the walls of the cylindrical chamber to provide a reciprocable fluid-tight seal, a removable bonnet on the body having a valve operating element thereon, and a flexible impervious diaphragm confined between the bonnet and body extending over the top of the stem portion of the valve element for transmitting motion from the operating element to the valve element, there being cooperating parts on the valve element and body element to limit the opening movement of the valve element to a range where the cup-like sealing member will remain within the cylindrical chamber.

2. A valve as recited in claim 1, characterized by having the body formed in two parts, one of which has a valve seat therein and has pipe connections thereon which are all of the connections for the valve, the second part being removably sealed to the first part and projecting beyond the first part and having therein the said means which provides the cylindrical chamber, said second part also having the bonnet secured thereto, whereby said first part may be connected or soldered into a pipe line before the second part is applied thereto and whereby the second part with all of the associated elements may be removed for repair without disconnecting the first part from the pipe line in which it is connected.

3. A valve as recited in claim 1, characterized by having the body formed in two parts, one of which has a valve seat therein and has pipe connections thereon which are all of the connections for the valve, the second part being removably sealed to the first part and projecting beyond the first part and having therein the said means which provides the cylindrical chamber, said second part also having the bonnet secured thereto, whereby said first part may be connected or soldered into a pipe line before the second part is applied thereto and whereby the second part with all of the associated elements may be removed for repair without disconnecting the first part from the pipe line in which it is connected and wherein the means in the body for limiting the opening movement of the valve is a separate disk-like member having a central portion through which the stem portion of the valve element slides and a rim portion which is confined between the two parts of the body whereby the valve element and its sealing member may be removed from the inner end of said second body part for repair and replacement when the two body parts are separated.

4. The combination with a diaphragm type valve, having a body, a bonnet removably held on the body, a diaphragm between the bonnet and body, the bonnet having a valve operating member thereon, there being a valve element having a stem portion and a valve portion in the body, of means sealed in the body forming a cylindrical chamber concentric about the stem portion of the valve element, and a thin metal cup-like sealing element on the stem portion of the valve element adapted to be expanded by fluid pressure into a sliding sealing fit with the interior of the cylindrical chamber, and supporting means on the valve stem for reinforcing the cup-like member against pressure in an endwise direction, the said means providing the cylindrical chamber being secured against endwise displacement when the bonnet and diaphragm are removed with the valve under pressure, said sealing element serving to prevent leakage of fluid when the bonnet and diaphragm are removed, or when the diaphragm is ruptured with the valve element in full open or full closed or any intermediate position.

5. A diaphragm type valve adapted for use in a pressure line, comprising a body with a removable bonnet and a sealing diaphragm between the bonnet and body, said body having a valve element therein with a valve portion and a stem portion, and expansible means in the valve body having a flexible skirt extending towards the pressure side valve body forming a sliding seal between the stem portion of the valve element and the body, said means providing a secondary seal in the valve for preventing leakage of the fluid by expansion of the skirt, should the diaphragm rupture with the valve in a closed or an intermediate position or with the diaphragm removed.

6. A diaphragm type valve which is sealed against escape of fluid upon rupture of the diaphragm whether the valve element is open or closed or in any intermediate position or when the valve bonnet is removed for replacement of the diaphragm, comprising a body member having means therein providing a cylindrical chamber sealed into the body to prevent leakage of the fluid between said means and the body, a valve element having a valve portion and a stem portion, an expansible cup-like sealing member on the stem portion adapted to be urged by fluid pressure against the walls of the cylindrical chamber to provide a reciprocable fluid-tight seal, a removable bonnet on the body having a valve operating element thereon, a flexible impervious diaphragm confined between the bonnet and body extending over the top of the stem portion of the valve element for transmitting motion from the operating element to the valve element, there being cooperating parts on the valve element and body element to limit the opening movement of the valve element to a range where the cup-like sealing member will remain within the cylindrical chamber, the stem portion of the valve element having a headed screw passing through the cup for retaining the cup-like sealing member in place, and a compressible member between the head of the screw and the cup forming a sheath for the cup.

7. A diaphragm type valve having a body, a reciprocable valve member in the body having a valve stem, a sealing diaphragm in the body across the end of the stem, operating means on the opposite side of the diaphragm from the valve for flexing the diaphragm to actuate the valve, the valve body having a cylindrical chamber sealed therein in such manner that fluid cannot pass through the body outside of the chamber even when the diaphragm is removed with the valve under pressure, and an expansible deformable packing element secured to the valve stem for reciprocable movement with the valve and having a sealing engagement with the interior wall of the cylindrical chamber whereby a packing is provided for the valve between the valve member and the diaphragm which floats with the valve and enables the valve to be rapidly closed even though liquid has leaked past the deformable packing into the space above the packing and below the diaphragm.

8. A diaphragm type of valve comprising a main body member having a valve set therein, and pipe connections thereon, a removable body section sealed onto the main body member having a cylindrical chamber therein extending axially therethrough, a valve in the valve body cooperating with the valve seat and having a stem which extends axially through said cylindrical chamber, a bonnet secured to the removable body section, a flexible diaphragm between the said second body section and the bonnet, valve operating means in the bonnet, the valve stem terminating against the inner face of the diaphragm, the valve stem having a packing thereon engaging the interior walls of said cylindrical chamber and forming a sliding seal therewith, the arrangement being such that the second body member with the valve and bonnet and associated parts can be removed and replaced while the main body member remains connected in the pipe line in which it is used.

9. A diaphragm type of valve comprising a main body member having a valve set therein, and pipe connections thereon, a removable body section sealed onto the main body member having a cylindrical chamber therein extending axially therethrough, a valve in the valve body cooperating with the valve seat and having a stem which extends axially through said cylindrical chamber, a bonnet secured to the removable body section, a flexible diaphragm between the said second body section and the bonnet, valve operating means in the bonnet, the valve stem terminating against the inner face of the diaphragm, the valve stem having a packing thereon engaging the interior walls of said cylindrical chamber and forming a sliding seal therewith, the arrangement being such that the second body member with the valve and bonnet and associated parts can be removed and replaced while the main body member remains connected in the pipe line in which it is used, and a separate valve stem guide member through which the valve stem passes confined between the main body member and said removable body section and which cooperates with the valve on the valve stem to limit the opening movement of the valve.

JOHN S. FORBES.